Aug. 5, 1930.  M. J. E. VIVIER  1,772,233
PROTECTING APPARATUS FOR DRIVERS OF MOTOR OR OTHER VEHICLES
Filed Jan. 25, 1929
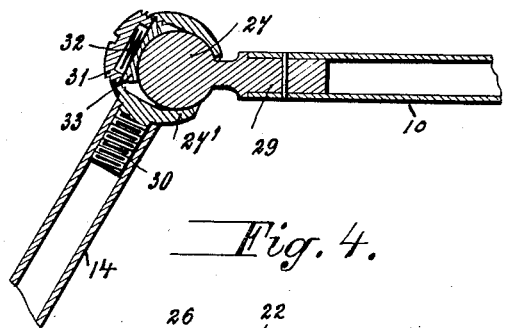
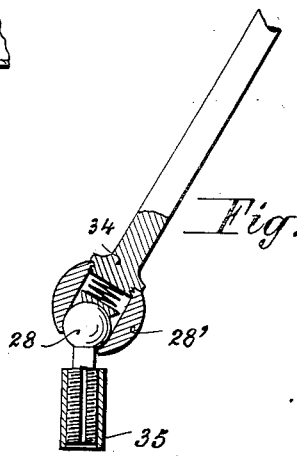
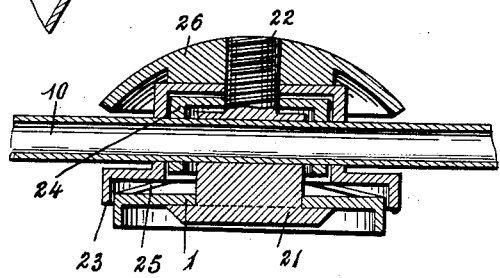
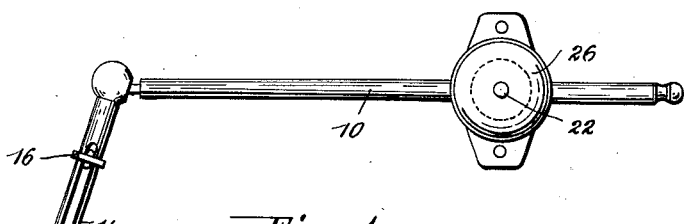
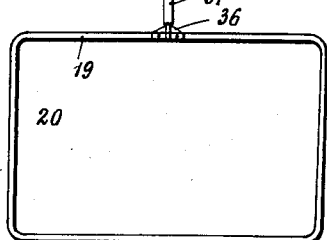
INVENTOR
M.J.E. VIVIER,
BY [signature] ATTY.

Patented Aug. 5, 1930

1,772,233

UNITED STATES PATENT OFFICE

MAURICE JULES ERNEST VIVIER, OF EVREUX, FRANCE

PROTECTING APPARATUS FOR DRIVERS OF MOTOR OR OTHER VEHICLES

Application filed January 25, 1929, Serial No. 335,057, and in France April 16, 1928.

It has already been proposed to protect the drivers of vehicles from the sun and from the reflections from the road, and also from the blinding effect of the headlights of vehicles coming in the contrary direction; by the use of screens adapted to absorb or intercept a part of the prejudicial radiations. Known devices are in use for this purpose in the shape of colored screens which extend from the vehicle top at a fixed or variable inclination, or of screens mounted on the wind screen before the driver's eyes. Such screens are however defective due to the fact that they have at most only two degrees of movement, corresponding to their angular displacement about a horizontal axis and to the displacements of this axis in a vertical plane.

The present invention relates to a screen device having three degrees of movement, so that it can be placed in any position in space, and with reference to the driver's head, and thus the screen may be disposed in his line of sight at all inclinations and heights, as well as in the lateral position.

The invention thus relates to a screen comprising a universal joint and mounted below the top of the vehicle above the driver's head, and which may be placed in any position with reference to the latter.

In the accompanying drawing and by way of example:

Fig. 1 shows a construction for the universal joint support employed for the protecting apparatus according to the invention.

Figs. 2 and 3 are vertical sections showing the ball-and-socket joints.

Fig. 4 is a vertical section of the support of the apparatus.

As observed in the form of construction herein represented by way of example in Fig. 1, the movable protecting screen according to the invention may be suspended by jointed arrangement constructed as follows:

A base plate 1 is secured by side lugs and screws to the top of the interior of a motor or other vehicle.

The said base plate 1 carries a central journal 21 at whose top is mounted a threaded shank 22, and said base is pierced with a hole whose axis is perpendicular to the axis of said journal 21. Upon the threaded part 22 are mounted two concentric concave members 23—24, pierced with apertures corresponding to the said hole in the journal 21, through which holes is inserted the horizontal tube 10. The said concave members 23—24 hold the tube 10 in position due to the shearing stress, and this, by the cooperation of the elastic washer 25, provides a sufficient friction to hold the arrangement in place while allowing it to rotate on the journal 21. These two operations take place at the same time by the pressure afforded by a milled nut 26 upon the threaded part 22 of the journal 21.

The said tube 10 carries at one end, by means of a ball 27 an extensible arm 14 comprising telescoping parts.

The internal end of said arm 14 is provided with a set screw 16 and carries at the end a ball 28, pertaining to the frame 19 in which is disposed a screen 20.

The said screen 20 may be transparent or opaque, optionally colored, metallic, brilliant or dull, according to the purpose for which it is to be used. It may in certain cases be replaced by a clear glass pane or a mirror.

The operation of the apparatus, which is very simple, is as follows:

The two ball devices 27—28 permit to turn the said frame in all directions, and the sliding of the tube 10 and the extensible nature of the arm 10 allow the frame to be moved vertically and horizontally with reference to the support securing the apparatus to the top of the vehicle.

The apparatus as a whole may be turned about the journal 21, and the devices will always remain in position due to the friction of the concave washer 25.

It will be remarked, upon a purely constructional point of view, that the ball device 27 is provided with an arm 29 inserted into the horizontal tube 10 and held by a pin; into one end of the outer tube of the telescoping element 14 is screwed a shank 30 for securing the socket 27' cooperating with the ball 27, and provided with a separate cap 31 acting upon a spring 32 adapted to urge a friction shoe 33 against the ball 27. A like arrangement is provided for the socket 28' cooperating with the ball 28, but the separate cap 34 herein consists of the inner rod of the telescoping arm 14. The ball 28 comprises a threaded shank 35 into which is screwed the extension part of the member 36, mounted on the frame 19 of the screen 20. The said member 36 may be provided with a turning wing 37 forming a push-piece.

I claim:

1. A protecting device for drivers of motor vehicles comprising a screen, a rod universally connected to said screen, a tube slidably receiving said rod, means carried by the rod to lock said tube and rod together, a second tube universally connected to the first tube, a base plate having a threaded shank slidably receiving said last mentioned tube and secured to said vehicle, a concave member carried by said shank and receiving said slidable tube, a second concentric concave member carried by the shank and also receiving the tube, and a nut threaded on said shank to tension the shearing relation between the concentric concave members and hold the tube in desired position.

2. A protecting device for drivers of motor vehicles comprising a screen, a rod universally connected to said screen, a tube slidably receiving said rod, means carried by the rod to lock said tube and rod together, a second tube universally connected to the first tube, a base plate secured to said vehicle, a journal carried in said base plate and having an upstanding threaded shank, said shank slidably receiving said last mentioned tube, a concave member carried by said shank and receiving said slidable tube, a second concentric concave member carried by the shank and also receiving the tube, and means cooperating with the shank and journal to tension the shearing relation between the concentric concave members to hold the tube in desired position.

In testimony whereof I have signed my name to this specification.

MAURICE JULES ERNEST VIVIER.